United States Patent
Takeuchi

[11] 3,878,812
[45] Apr. 22, 1975

[54] APPARATUS FOR APPLYING WAX TO VEHICLES TO BE POLISHED

[75] Inventor: Shigeo Takeuchi, Nagoya, Japan

[73] Assignee: Takeuchi Tekko Kabushiki Kaisha, Nagoya-shi, Japan

[22] Filed: Aug. 1, 1973

[21] Appl. No.: 384,734

[30] Foreign Application Priority Data
Nov. 16, 1972  Japan.............................. 47-114306

[52] U.S. Cl. ......................... 118/2; 118/8; 118/323; 134/45
[51] Int. Cl. ............................................ B05c 5/00
[58] Field of Search ........ 118/2, 8, 323, 73; 134/45, 134/123

[56] References Cited
UNITED STATES PATENTS

| | | | |
|---|---|---|---|
| 2,215,668 | 9/1940 | Smith | 118/2 |
| 3,196,888 | 7/1965 | Rousseau | 134/45 |
| 3,724,415 | 4/1973 | Knight | 118/2 |

*Primary Examiner*—Dorsey Newton

[57] ABSTRACT

An apparatus including wax ejector means and proximity sensor means both adapted to pass over a vehicle along the top profile thereof. The sensor is operable to energize the wax ejector only during passage over the painted upper surfaces of the vehicle, ensuring that wax is applied solely to such vehicle surfaces without contaminating the front and rear windows of the vehicle.

1 Claim, 12 Drawing Figures

APPARATUS FOR APPLYING WAX TO VEHICLES TO BE POLISHED

BACKGROUND AND SUMMARY OF THE INVENTION

This invention relates to apparatus for applying waxes to the surfaces of freshly washed and dried vehicles to be polished and has for its object the provision of a new and improved apparatus of the kind described which is capable of applying wax exclusively to the painted upper surfaces of a vehicle in an automatic fashion during movement thereof.

According to the present invention, an apparatus for applying wax to the surfaces of vehicles during movement thereof is provided which comprises, among others, wax ejector means including a row of wax guns and adapted to pass over a vehicle being advanced along the top profile thereof and means for controlling said wax ejector means in a manner so that wax is ejected when the wax guns are passing over the painted upper surfaces of the vehicle including the bonnet, roof and rear boot surfaces thereof but not when they are passing over the front and rear windows of the vehicle. In this manner, the present invention makes it possible to apply wax exclusively to the painted upper surfaces of vehicles in an exact manner without contaminating with wax the front and rear windows thereof and thus without any loss of wax.

The above and other objects, features and advantages of the present invention will become apparent from the following description when taken in conjunction with the accompanying drawings, which illustrate one preferred embodiment of the invention.

DESCRIPTION OF THE PREFERRED EMBODIMENT

Figure 1:
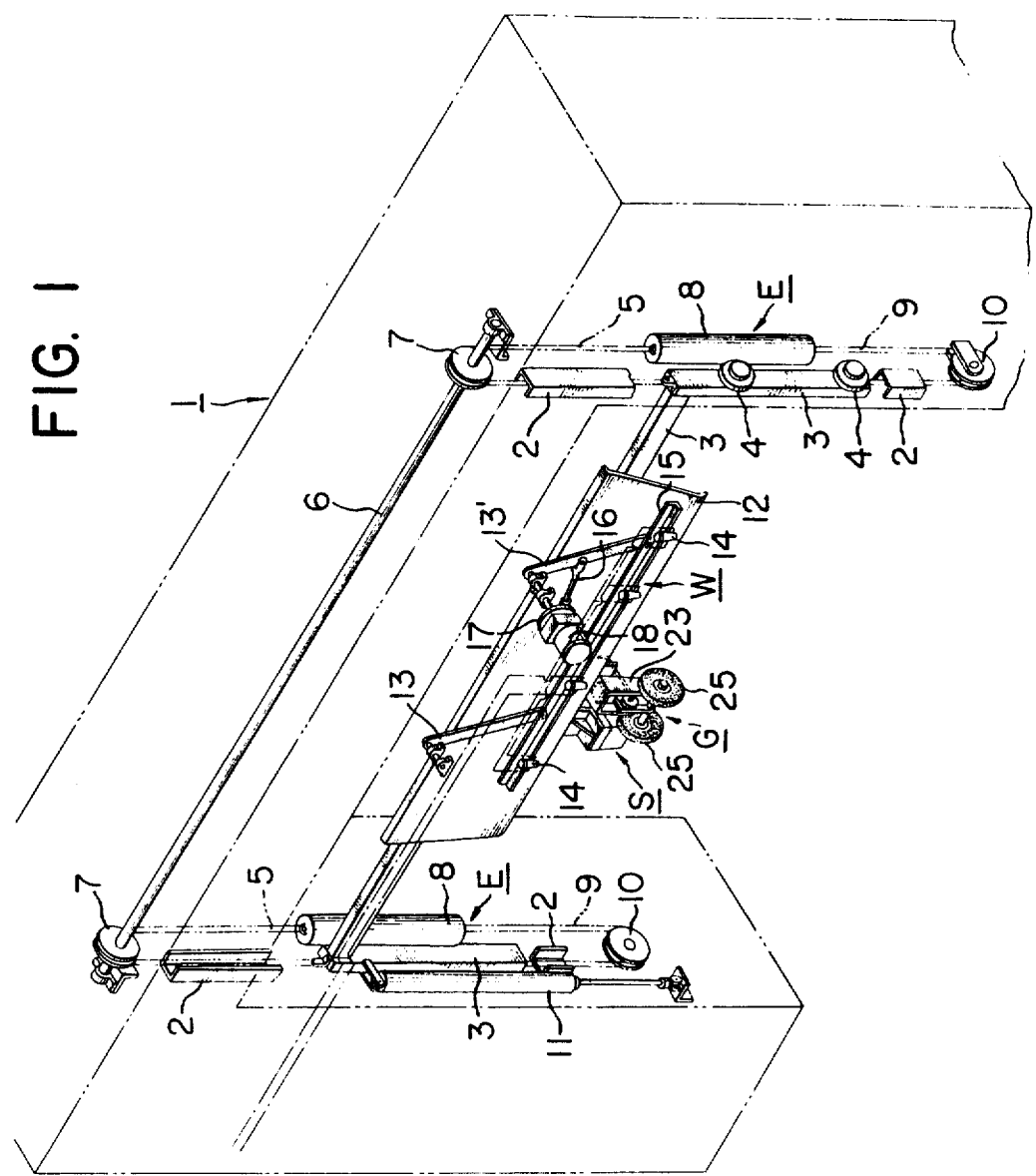
FIG. 1 is an oblique view of the whole apparatus embodying the present invention.

In the drawings, reference numeral 1 indicates the frame of the apparatus, which is a structure of portal form through which a vehicle can progress. A pair of guide members 2 of channel section are vertically secured to the opposite sides of the portal structure 1. Reference numeral 3 indicates a vertically movable support frame of portal form adapted to transversely span the advancing vehicle and including a horizontally extending elongate body and a pair of side legs depending from the opposite ends thereof, said side legs being vertically slidably fitted in the respective guide members 2 through the medium of respective pairs of guide rollers 4 journalled on the legs. The frame 3 can thus be raised and lowered along the guide members 2 by appropriate actuator or elevator means such as generally indicated by E in FIG. 1. A pair of upper and lower chain belts 5 and 9 are anchored to each of the legs of the frame 3 at the top and bottom thereof. Upper chain belts 5 are each entrained about a chain pulley or sprocket wheel 7 fixedly mounted on a horizontal shaft 6, which is journalled on the portal structure 1, and are each secured at the opposite end to the top of a counterweight 8. Lower chain belts 9 are each entrained about a chain pulley or sprocket wheel 10, rotatably mounted on the portal structure 1 at the bottom thereof, and secured at the opposite end to the bottom of the counterweight 8. In this manner, the vertically movable frame 3 is normally biased to rise under the effect of the counterweights 8. Reference numeral 11 indicates a pneumatic actuator unit comprising a tubular cylinder member, which is pivotally secured at the top end to one of the legs of the frame 3, and a piston member pivotally secured at the bottom to the frame structure 1 of the apparatus. Obviously, the pneumatic actuator unit 11 thus arranged is operable, when energized, to cause the frame 3 to descend against the gravity effect of counterweights 8.

Secured to the horizontal body portion of the movable frame 3 at the center thereof is a mounting plate 12 which carries on one side thereof wax ejector means W adapted to direct wax jets evenly against the top surface of a moving vehicle all over the width thereof. Supported on the lower edge of the mounting plate 12 centrally thereof are guide means G for controlling the actuator means E in accordance with the top profile of the moving vehicle and sensor means S operable by proximity to any painted upper surface of the vehicle to energize the wax ejector means W. The sensor means S may be of a known magnetic type which is responsive to metallic materials but not to non-metallic materials.

Figure 4:
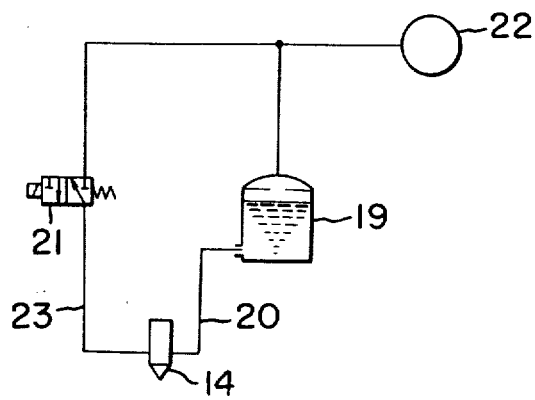
FIG. 4 is a connection diagram of the wax ejecting system of the apparatus.

Description will first be made of the construction and arrangement of the wax ejector means W. Referring again to FIG. 1, a pair of substantially parallel links 13, 13' are pivoted at the top end to the upper edge of the mounting plate 12 for rocking movement in a plane parallel thereto with a bar bracket 15 pivotally secured to the lower ends of links 13, 13' in a horizontal position, and on which bracket 15 a plurality of wax guns 14 are mounted in a row in spaced apart relation to each other. A connecting link 16 is pivotally secured at one end to one of the parallel links, 13', intermediate the ends thereof and is connected at the other end with a disc 17 at an appropriate radial distance from its axis. Disc 17 is fixedly mounted on the output shaft of a drive motor 18 supported on the mounting plate 12. Obviously, with this arrangement, gun carrier bracket or bar 15 is swung right and left while holding its horizontal position under the drive of motor 18. As shown in FIG. 4, each of the wax guns 14 is connected with a wax supply pipe 20 leading from a wax tank 19 and with a pressure air supply pipe 23, which is connected to a source of pressure air 22 through the intermediary of an electromagnetic valve 21. Wax guns 14 are each provided therein with a valve means adapted to open to allow ejection of wax therethrough when the electromagnetic valve 21 is opened to supply pressure air to the wax gun. As shown, the wax tank 19 is in communication with the source of pressure air 22, at all times supplying the wax guns 14 with wax under pressure.

Figure 2:
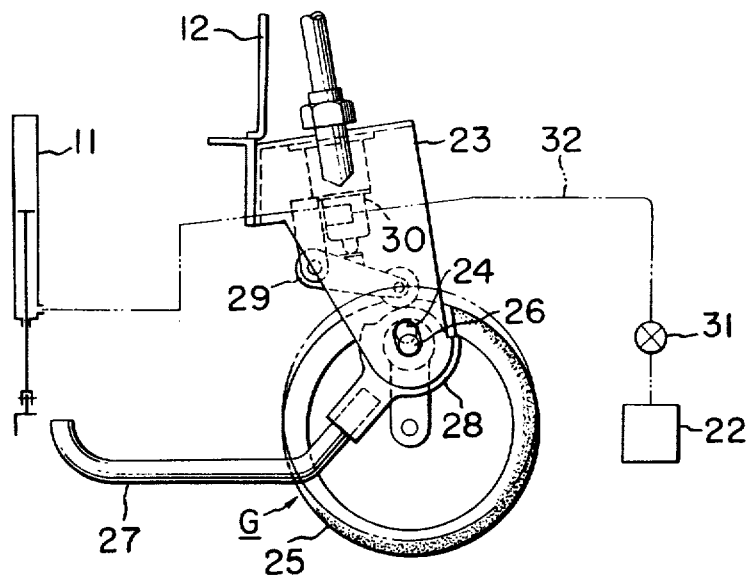
FIG. 2 is a fragmentary partly schematic side elevation of the guide means and the pneumatic system operable under its control.

Description will next be made of the guide means G principally with reference to FIG. 2. A support bracket 23 of inverted U form is secured at the top to the lower edge of mounting plate 12 with a pair of aligned vertically elongate slots 24 formed in the opposite legs of the support bracket 23 at the bottom thereof to loosely support a roller and cam assembly by way of a support shaft 26 forming part thereof. As shown, the shaft 26 is loosely fitted through the elongate slots 24 for limited vertical movement. The roller and cam assembly also includes a pair of roller wheels 25 supported by the shaft 26 and a cam plate 28 firmly secured to the latter and formed integral with a feeler rod 27, which extends rearwardly beyond the mounting plate 12. A cam follower lever 29 is pivotally mounted on the plate 12 and held at the distal end in operative engagement with the contoured top of the cam plate 28. Reference numeral 30 indicates a switching valve which includes an actuator rod held in contact with the upper side of cam follower lever 29 intermediate the ends thereof and is inserted in an air line 32 connecting the pneumatic actuator 11 with the source of pressure air 22. The switching valve 30 serves in one of its two operative positions to supply the pneumatic actuator 11 with pressure air from the source 22 and in the other position to release the pressure air to the atmosphere. Reference numeral 31 indicates a stop valve inserted in the air line 32. In operation, when the pair of roller wheels 25 is raised as indicated by the dotted lines in FIG. 2 or when the feeler rod 27 is turned clockwise as viewed in this figure, the cam plate 28 causes the rocker arm or cam follower lever 29 to rock upwardly so that the switching valve 30 is actuated into the said other position and the pressure air from the source 22 is released. On the other hand, when the pair of roller wheels 25 or the feeler rod 27 is restored to the normal position shown by the solid lines in FIG. 2, the switching valve 30 is actuated so as to feed the pneumatic cylinder 11 with pressure air from the source 22.

Figure 3:
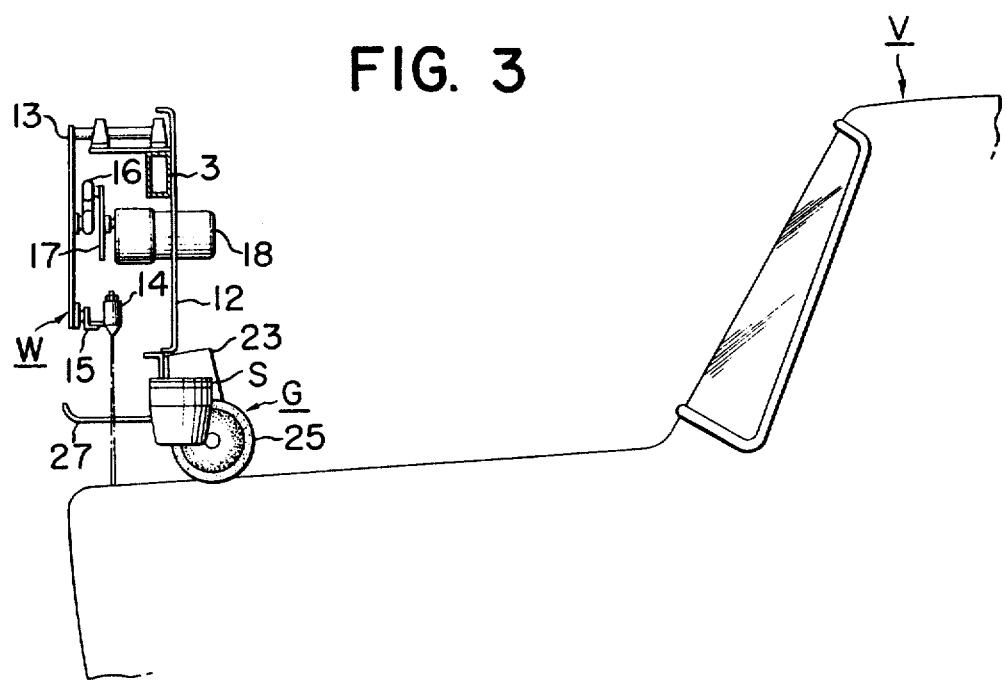
FIG. 3 is a side elevational view showing the apparatus working on the bonnet of a vehicle to apply wax thereto.

As observed from FIGS. 1 and 3, the proximity sensor means S supported on the mounting plate 12 is positioned on one side of the above described guide means G forwardly of the row of wax guns 14 to enable the latter to swing clear of the sensor means. It is to be understood that the sensor means is designed so as to operate when it comes in proximity to any of the painted metal top surfaces of a vehicle V and to be rendered inoperative when it comes to pass over the front or rear window of the vehicle or when it is separated from any of the painted metal surfaces of the vehicle at least by a definite minimum distance.

Figure 5:
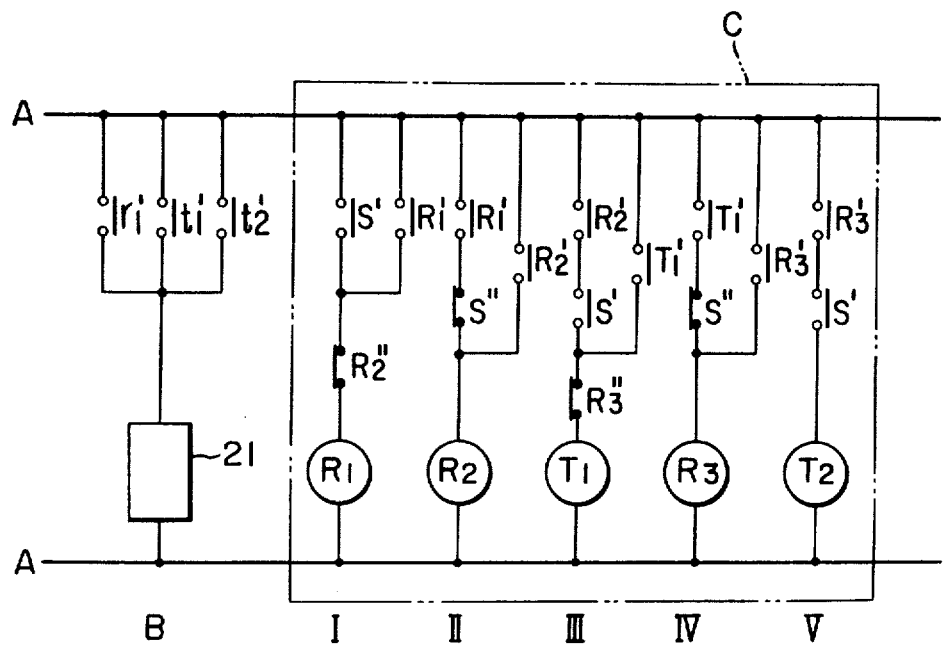
FIG. 5 is a connection diagram of the electrical system of the apparatus.

A typical arrangement of electrical system usable in the present invention will next be described with reference to FIG. 5, in which reference character B designates an electromagnetic valve operating circuit connected across the power line A—A and including electromagnetic valve 21 and three parallel-connected switches, i.e., a first operating switch $r_1'$ of the common type and a second and a third operating switch $t_1'$ and $t_2'$ both of the delay operation type. Reference character C represents a control circuit network for controlling the operating switches $r_1'$, $t_1'$ and $t_2'$ and including circuits I, II, III, IV and V connected across the power line A—A in parallel with each other. In the network, references S' and S'' respectively indicate a normally open proximity switch and a normally closed proximity switch, both of which are operated by the above-described proximity sensor S. Reference characters $R_1$, $R_2$ and $R_3$ indicate respective relay coils and the same references, single-primed ('), indicate normally open relay switches operable by the respective relay coils, the same references, double primed (''), indicating normally closed relay switches operable simultaneously with the respective normally open relay switches. References $T_1$ and $T_2$ indicate timer relay coils provided for operating the first and second operating switches $t_1'$ and $t_2'$, respectively.

Description will next be made of operation of the apparatus embodying the present invention having particular reference to FIGS. 6($a$) through 6($g$) of the drawings. As will readily be noted, the movable frame 3 carrying the mounting plate 12 is held in the raised position under the gravity of counterweight 8 as long as the pneumatic actuator 11 is in the inoperative state.

Now, when the stop valve 31 (FIG. 2) is opened to supply pressure air through the switching valve 30 to the lower chamber in the pneumatic actuator 11, the latter is caused to contract thereby to lower the movable frame 3 to its bottom position against the gravity of counterweights 8. In this position of movable frame 3, the roller wheels 25 are held at a level appropriate for rolling engagement with the bonnet of a vehicle.

Accordingly, as a vehicle V freshly washed and dried is advanced through the structure 1 of the apparatus, the roller wheels 25 of the guide means G come to contact the surface of the bonnet of the vehicle and roll thereover holding the proximity sensor S at a definite distance from the bonnet surface, as shown in FIGS. 3 and 6($a$).

When the proximity sensor S is rendered operative as it comes within a predetermined distance from the bonnet of the vehicle, the normally open proximity switch S' is closed while at the same time normally closed proximity switch S'' is opened and thus the circuit I for controlling wax application to the bonnet is completed to energize the relay coil $R_1$ thereby to close the first operating switch $r_1'$ in the electromagnetic valve operating circuit B. As a consequence, the electromagnetic valve 21 is opened to allow ejection of wax through the wax guns and thus the bonnet surface is coated with wax in an automatic fashion. At this time, the relay switch $R_1'$ in parallel with proximity switch S' is also closed to self-hold the control circuit I for wax application to the bonnet. Though, in this self-holding state the relay switch $R_1'$ in the circuit II is also held in its closed position, the circuit II itself remains without any output as the proximity switch S'' arranged therein is kept open, the circuit II serving for memorizing wax application to the bonnet.

As the vehicle V progresses continually, the proximity sensor S reaching the front windshield of the vehicle is rendered inoperative when it reaches the front windshield of the vehicle V, as shown in FIG. 6($b$), the proximity switch S'' restores its normal closed position to complete the memorizing circuit II for the first time while at the same time relay coil $R_2$ and relay switch $R_2'$ cooperate to hold the circuit II in the state thus completed and the normally closed relay switch $R_2''$ is operated to open the control circuit I. As the consequence, the first operating switch $r_1'$ in the circuit I is opened to interrupt wax ejection and this state is maintained as long as the memorizing circuit II is self-holding. As will readily be understood, the self-holding state of circuit II represents its memorization of the fact that wax application to the bonnet has been completed and such memory is transferred to the next control circuit III for wax application to the roof as the relay coil $R_2$ operates to close the relay switch $R_2'$ in the circuit.

Figure 6A:
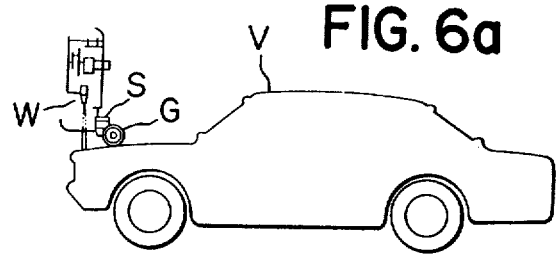
FIGS. 6(a) through 6(g) successive stages of operation of the apparatus.
Figure 6B:
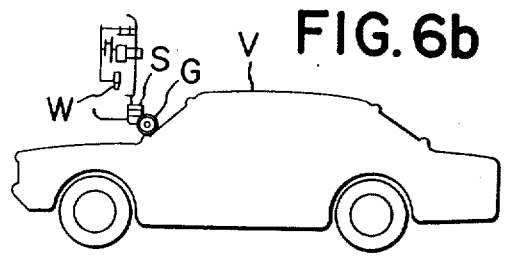
Figure 6E:
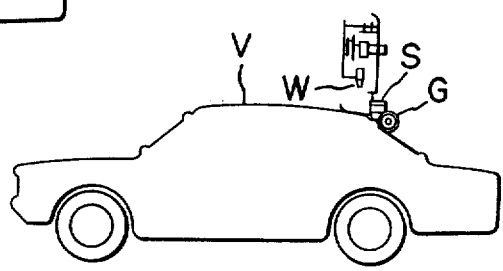
Figure 6C:
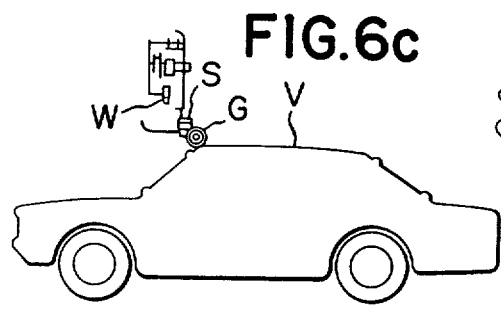
Figure 6D:
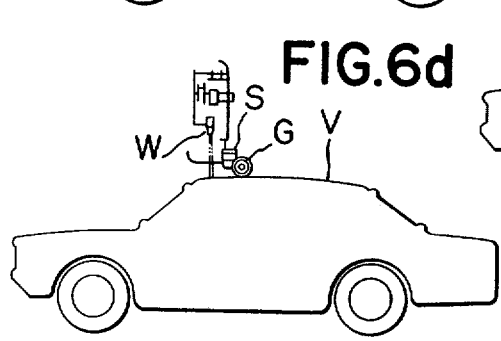

Subsequently, when the proximity sensor S comes to sense the front end of the roof of the vehicle, as shown in FIG. 6(c), the proximity switch S' is closed to complete the control circuit III and the timer coil $T_1$ is energized to send a closing signal to the second operating switch $t_1'$ in the valve control circuit B and timer relay switches $T_1'$ in the control circuit III and memorizing circuit IV for wax application to the roof. Only, on this occasion, these switches $t_1'$ and $T_1'$, being of the delay type, are actually closed after lapse of a predetermined length of time. As will be noted, the delay time corresponds to the length of time elapsing between the instant of operation of sensor S and the arrival of the wax guns 14 positioned somewhat to the rear thereof at a point above the front edge of the roof of the vehicle. This eliminates the danger that in the initial period of wax application to the roof when the electromagnetic valve 21 is again opened wax be ejected in vain onto the top region of the front window of the vehicle. At the same time, the control circuit III self-holds its completed state so that the timer relay coil $T_1'$ in the next circuit IV is held in its closed position. It will be apparent that the ejection of wax through the wax guns 14 continues as long as the proximity sensor S is passing over the roof of the vehicle.

Figure 6F:
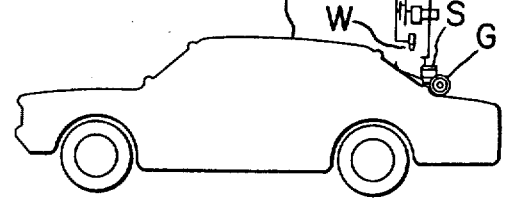
Figure 6G:
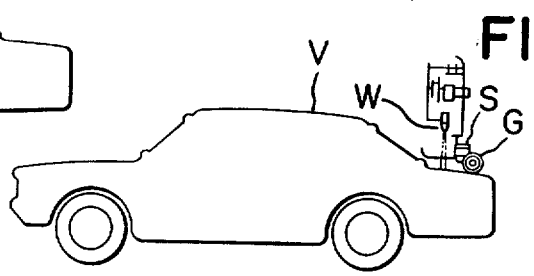

Subsequently, when the proximity sensor S passing over the roof reaches a point above the top edge of the rear window of the vehicle V, as shown in FIG. 6(e), it is rendered inoperative and the proximity switch S'' is closed so that the circuit IV for memorizing wax application to the roof is closed for the first time and self-holds the closed state. It will be noted that upon energization of relay coil $R_3$ in this instance the circuit III previously held closed is opened so that the second operating switch $t_1'$ in the valve operating circuit B is opened to close the electromagnetic valve 21 and accordingly wax ejection through the wax guns 14 is interrupted. Simultaneously with this, relay switch $R_3'$ in the control circuit V for wax application to the rear boot or trunk is closed, placing this circuit in a state just to be completed upon the closing of proximity switch S'. Thus, the circuit V is completed subsequently when the proximity sensor S comes to sense the rear boot of the vehicle V, as shown in FIG. 6(f), and at the same time timer relay coil $T_2$ is energized to operate the third operating switch $t_2'$ in the valve operating circuit B. In this instance, however, since the operating switch $t_2'$ is of the delay type like switch $t_1'$, the electromagnetic valve 21 is actually opened again only after a predetermined length of time has elapsed which corresonds to the time length between the instant when the front edge of the boot is sensed by the proximity sensor S and the instant when the wax guns reache that boot edge. This eliminates the danger that wax initially ejected through the guns 14 when the electromagnetic valve 21 is opened again be applied to the rear window of the vehicle, ensuring that such wax is accurately applied solely to the surface of the rear boot. It will be apparent that ejection of all through guns 14 is maintained all while the proximity sensor S is lying over the rear boot. Subsequently, upon departure of the proximity sensor S from the rear edge of the boot, the timer relay coil $T_2$ is de-energized and the third operating switch $t_2'$ is opened, causing the electromagnetic valve 21 to close thereby to complete one cycle of operation of the wax applying apparatus.

Though, in the process described above, the memorization circuits II and IV once completed are left to remain self-holding, they can be readily released, for example, by opening a main switch, not shown, which is arranged in the power line A—A.

It is to be noted that, during the above-described process of wax ejection effected along the top surface of a vehicle, the wax ejector means W and proximity sensor means S are guided over the vehicle surface by guide means G, which operates as follows:

In the process, when the pressure of contact of roller wheels 25 rolling over the vehicle exceeds a predetermined value, they are raised together with the support shaft 26, slidably received in the vertically elongate slots 24, to push up the lever arm 29 thereby to actuate the switching valve 30 into a position to release the pressure air from the source of pressure air 22 to the atmosphere so that the movable frame 3 is allowed to rise under the effect of counterweights 8. Contrarily, as the pressure of contact between the wheels 25 and the vehicle falls below the predetermined value, the roller wheels 25 descend and the switching valve 30 restores its position to again supply the pneumatic cylinder 11 with pressure air so that the movable frame 3 is lowered. In other words, the movable frame 3 is guided to pass over the vehicle V while being adjusted in vertical position so that a substantially constant pressure of contact is maintained at all times between the guide wheels 25 and the surface of the vehicle and in this manner the proximity sensor means S is held practically at a definite distance from the surface of the moving vehicle. Referring again to FIGS. 6(e) and 6(f), it is to be noted that as the guide means G reaches the rear window of the vehicle, the feeler rod 27 coming into contact therewith is caused to turn clockwise as viewed in FIGS. 6 and 2 and the cam follower lever 29 is raised by the camming surface of cam plate 28, which is integral with feeler rod 27, to actuate the switching valve 30 into a position to release the pressure air from source 22 to the atmosphere so that the movable frame 3 is raised under the effect of counter-weights 8. The arrangement is such that, even when the vehicle is of the van type including a substantially vertical rear window, any sudden fall of the movable frame 3 is effectively prevented.

Further, during the cycle of operation described above, the drive motor 18 provided for the wax ejector means W is kept energized so that the wax gun carrier bracket is continuously swung right and left while maintaining its horizontal position through the intermediary of disc 17, connecting rod 16 and the pair of parallel links 13, 13', thus moving transversely of the moving vehicle V in a zigzag fashion. Obviously, this ensures that wax is evenly applied all over the painted upper surfaces of the vehicle including the bonnet, roof and rear boot surfaces thereof and thus makes it possible subsequently to give a good luster to all the vehicle surfaces by buffing operation.

To summarize, the present invention provides an apparatus for applying wax to vehicles in which guide means G and actuator means E operable under control thereof serve to hold the vertically movable frame 3 and particularly proximity sensor S and wax ejector means W supported thereon at respective predetermined distance from the surface of a vehicle during movement thereof, said proximity sensor means S being held operative during its passage over the painted upper surfaces of the vehicle including the bonnet, roof and rear boot surfaces thereof and inoperative during its passage over the front and rear windows of the vehicle so that wax is ejected through wax guns 14 of the wax ejector means W only when they are lying over the painted surfaces of the vehicle. The apparatus of the present invention is thus characteristically advantageous in that it is capable of ejecting wax in an exact manner only against the surfaces of the bonnet, roof and rear boot of a vehicle without contaminating the front and rear window surfaces thereof and in this manner any loss of wax is effectively precluded.

Though only one preferred embodiment of the present invention has been shown and described, it is to be understood that various changes and modifications may be made therein without departing from the spirit and scope of the invention or from the scope of the appended claims.

What is claimed is:

1. An apparatus for applying wax to painted upper surfaces of vehicles during movement thereof, comprising: a portal structure through which a vehicle can progress, a frame mounted on said portal structure for vertical movement relative thereto, elevator means operable to raise and lower said frame, guide means adapted to follow the top profile of the advancing vehicle and operable upon said elevator means to raise and lower said frame along the top profile of the advancing vehicle, wax ejector means supported on said frame to transversely span the advancing vehicle, and proximity sensor means supported on said frame and operable only when lying in proximity to any of the painted upper surfaces of the vehicle to energize said wax ejector means.

* * * * *